Aug. 17, 1965         W. MARCUS         3,200,954
POT STRAINER
Filed Nov. 3, 1960

INVENTOR.
WILLIAM MARCUS
BY
for Watts, Edgerton, Pyle & Fisher
Attorneys

United States Patent Office 3,200,954
Patented Aug. 17, 1965

3,200,954
POT STRAINER
William Marcus, Cleveland, Ohio, assignor to Merrymaid Plastics Corp., Cleveland, Ohio, a corporation of Ohio
Filed Nov. 3, 1960, Ser. No. 66,968
3 Claims. (Cl. 210—470)

This invention relates to pot strainers and more particularly to pot strainers for use with pots of a variety of sizes.

It is often desirable to drain off water or other liquid from foods that have been cooked in such liquid. One manner of draining off such liquid is to provide a strainer having a plurality of straining holes which are large enough to pass the liquid but small enough to retain the cooked food. The strainer is placed over the mouth of the cooking vessel and the cooking water is poured while still hot through the strainer while the cooked food is retained in the vessel.

Previous proposals for pot strainers have had attached handles. These attached handles project in a permanent fixed position relative to the body of the strainer. When such a strainer is used, the only safe use position is with the strainer handle projecting generally in the same direction as the pot handle and parallel to it. Such a strainer can be safely gripped in only the right or the left hand. Thus, with these previous proposals, the strainer has been either right- or left-handed, not both.

Previous strainers have had other inherent disadvantages. One of these disadvantages is that they have usually been formed from metal with inherent undesirable characteristics. They tend to become misshapen and distorted from careless storage, dropping, and other conditions which tend to damage. Unless formed of proper materials, relatively early deterioration, as by rusting is a very probable consequence. Handle-to-body connections are apt to loosen and fail.

With the present invention all of these disadvantages and others are overcome. They are overcome by providing a strainer composed of an integrally molded one-piece plastic body and a plastic handle which is releasably connectable to the body to project in a selected one of two directions. Thus, the strainer of this invention is selectively either a right- or a left-handed strainer.

One of the principle objects of this invention is to provide a pot strainer having new and novel handle connection which will permit the handle to project selectively in either direction.

Yet another object of this invention is to provide a pot strainer which has a handle engageable on one face thereof and selectively projectable toward opposite edges of the pot strainer, one at a time.

Another object of the invention is to provide a novel and improved handle-to-strainer body connection which may be facilely and repeatedly connected and disconnected.

A more general object of the invention is to provide a novel and improved plastic pot strainer which includes an integrally molded, one-piece plastic body.

A further object of the invention is to provide a novel and improved plastic pot strainer which is simple to manufacture, lightweight, and durable, and simple, safe and dependable to use.

Other objects and a fuller understanding of the invention may be had by referring to the following description and claims taken in conjunction with the accompanying drawing, in which:

Figure 1:
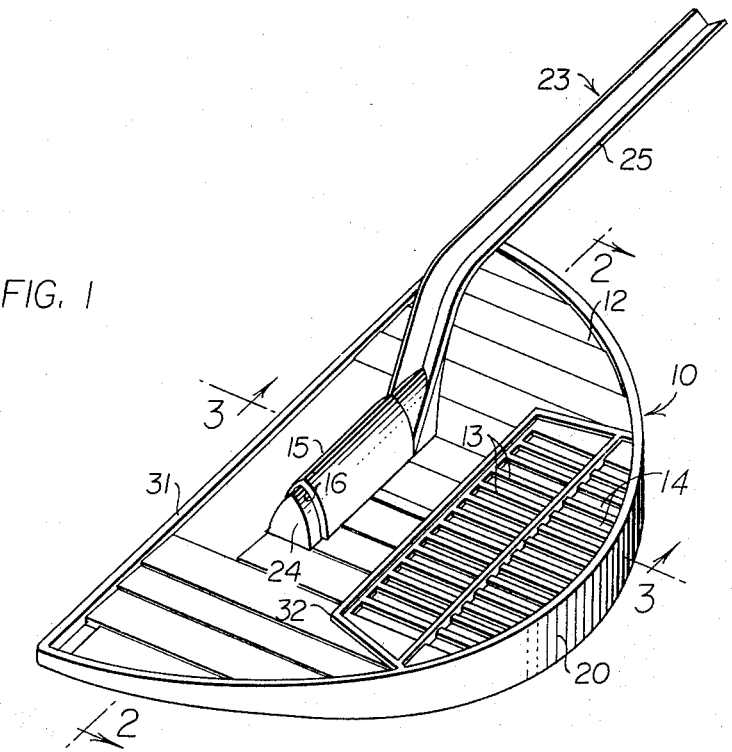
FIGURE 1 is a perspective view of the new and improved pot strainer with the handle engaged and projecting toward one side edge thereof.
Figure 2:
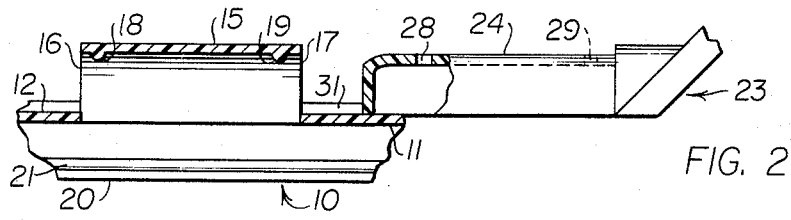
FIGURE 2 is a sectional detailed view of the handle-securing members with the handle positioned to be inserted; and, FIGURE 3 is a sectional view taken along line 3—3 of FIGURE 1.
Figure 3:
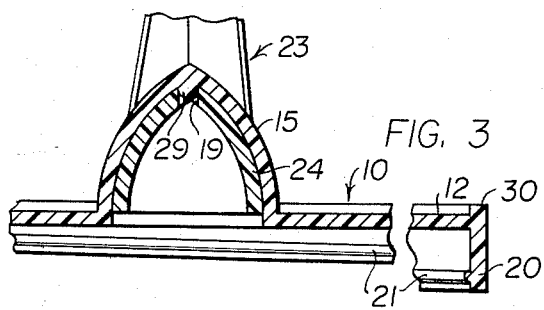

Referring now to the drawing, the new and improved pot strainer includes a body 10 which is symmetrical about an imaginary plane. The body 10 has an inner face 11 and an outer face 12. The body includes a plurality of bars 13 and a cross bar which define a plurality of pouring openings 14. The pouring openings 14 are of a shape which will permit liquid to pass but will prevent cooked foods from passing. The pouring openings are long, thin, and generally rectangular in shape. The grid pattern and the pouring openings are symmetrically disposed about and parallel to the body plane of symmetry in order that the pouring openings will be vertical in use and provide maximum pouring facility.

The body 10 includes an integrally-formed, generally U-shaped tunnel member 15. The tunnel member 15, like the remainder of the device is formed of a resilient, durable, plastic material. The tunnel member extends upwardly from the outer or upper face 12 and is disposed symmetrically about and normal to the body plane of symmetry.

The tunnel member 15 has a through passage defining a handle receiving tunnel. The tunnel is a uniform cross section extending from one entrance 16 to an oppositely oriented entrance 17.

The tunnel member 15 has a pair of small rib-shaped projections 18, 19 which project inwardly into the tunnel. The purpose of the projections 18, 19 will be described presently.

A handle 23 is provided. The handle 23 has support and gripping end portions 24, 25. The support end portion 24 is adapted to be inserted into the handle receiving tunnel through either of the entrances 16, 17. If the handle is inserted through the entrance 16, it projects toward one edge of the body, and if it is inserted through the entrance 17, it projects toward the opposite edge of the body. The gripping portion 25 is formed and positioned such that when the handle support portion is engaged in the tunnel, the gripping portion 25 is spaced from and generally parallel to the outer face 12. When the handle support portion is positioned in the tunnel, inside surfaces of the tunnel member 14 are in compressive abutting relationship with the support portion 24 of the handle. The force exerted by the wall against the support portion is sufficient to frictionally hold the handle in place. This friction can be overcome by a person pulling or pushing on the handle while holding the body 10.

The gripping end portion 24 is of generally V-shaped configuration. With this V-shaped configuration, the wall thickness is relatively uniform and therefore simple and easy to mold. Additionally, the gripping portion rests comfortably in the fingers of the operator's hand and the gripping portion provides a thumb-receiving slot to permit the operator to firmly and easily grip the gripping portion. The support portion 24 is also of substantially uniform wall thickness. It is of a contour corresponding to the tunnel member 15.

The support end of the handle is releasably locked in the tunnel by the coaction of the projections 18, 19 and a pair of apertures 28, 29. When the handle end portion is inserted as shown in FIGURE 1, the projection 18 will be positioned in the aperture 28 and the projection 19 will be positioned in the aperture 29. When the handle is engaged in the opposite direction, the projection 18 will be positioned in the aperture 29 and the projection 19 will be positioned in the aperture 28. Since the member 14 and the projections 18, 19 are resilient, a force exerted by the operator in inserting or removing the handle will overcome the detent action of the projections and allow them to snap into or out of the apertures depending upon whether the handle is being inserted or removed. In addition to providing a releasable lock for the handle, the projections and apertures will coact as locators to locate the handle in the tunnel.

The body 10 includes a flange 20. The flange 20 is a pouring skirt and a positioning guide which is used to position the strainer over the mouth of a pot. The flange 20 includes an inwardly extending rib 21 which abuts the outside of the rim of the pot to locate the strainer in the optimum position for pouring.

One of the outstanding advantages of the invention is obtained through the construction of the pot strainer body 10. The major portion of the body 10 is a flat, relatively thin portion of uniform thickness. This portion is defined by the faces 11, 12. It is in the shape of a segment of a circular disc. Rigidity is imparted to this major portion by the downwardly extending pouring skirt 20 which is along the circular edge of the body and has cross-sectional shape of a segment of a circle. Further rigidity is imparted by an upwardly directed extension of the skirt which provides an upwardly directed reinforcing rim 30, contoured to the shape of the same segment of a circle. A straight reinforcing rim 31 extends across the rearward extremity of the pot strainer to provide additional reinforcing. This rearward rim member 31 lies along a chord of the circle of the curved reinforcing rim and the pouring skirt. Still further reinforcing is provided by a rib 32 which extends along three sides of the grid-like pouring openings 14 to join, on either side of these openings, with the circular rim 30. The tunnel member 15 also contributes to the rigidity of the device. With this construction a relatively rigid, light-weight strainer body is obtained.

For ease of storage, apertures 34 are provided at one or both rearward corners of the pot strainer. Only one of the apertures is visible in the drawings. The apertures can serve as holes to receive a suitable support hanger.

Although the invention has been described in a great deal of detail, it is believed that it essentially comprises a pot strainer which has a one-piece integral body. It also includes a releasably securable handle which will selectively project toward opposite edges of the strainer.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pot strainer comprising a flat body having a curved edge and a straight edge defining the contour of a segment of a circle and a chord thereof, said body having a plurality of openings therethrough, a circularly contoured rim projecting from one face of said body and a flange adjacent said rim and projecting from the opposite face of said body, handle securing means carried by said one face of said body, said handle securing means being resilient and including an elongated U-shaped member extending parallel to said straight edge, said U-shaped member having a through passage generally parallel to said straight edge, said passage being a handle-receiving tunnel, said member having a pair of projections projecting into said passage, said handle-receiving tunnel having a pair of opposed handle entrances, a handle having gripping end and support end portions, said support end portion being releasably and selectively positionable in said tunnel through each entrance, said gripping end portion of said handle being vertically spaced from said one face of said body and generally parallel to said straight edge, said member being in compressive abutment with said support end portion of said handle, said handle having a pair of apertures positioned to interlock with said projections when said handle is engaged in said tunnel, and said handle and said body each being unitary one-piece molded plastic members.

2. A pot strainer comprising a flat body having a curved edge defining the contour of a segment of a circle, said body having a plurality of openings therethrough, handle securing means carried on one face of said body, said handle securing means including resilient walls defining a tunnel member having opposed handle entrances, said tunnel member extending substantially parallel to a chord of said circle, said tunnel member being midway between opposite edge portions of said body and symmetrical about the diametral line bisecting said chord, a handle member having a support end and a gripping end, said support end being manually releasably and compressively engaged in said tunnel member through a selected one of said entrances, said gripping end being substantially parallel to said chord and vertically spaced from said one surface of said body, and said members including releasably coacting surfaces formed to prevent relative movement when said support end is engaged in either entrance of said tunnel member, whereby said handle can be rigidly connected to said body by insertion through either of said entrances for right or left hand use.

3. A pot strainer comprising a flat body having a curved edge defining the contour of a segment of a circle, said body having a plurality of openings therethrough, handle-securing means carried on one face of said body, said handle securing means including resilient walls defining a tunnel member having opposed handle entrances, said tunnel member extending substantially parallel to a chord of said circle, a handle member having a support end and a gripping end, said support end being releasably and compressively engageable in said tunnel member through each of said entrances, said gripping end being substantially parallel to said chord and vertically spaced from said one face of said body, and said members including releasably coacting surfaces formed to prevent relative movement when said support end is engaged in either entrance of said tunnel member, said coacting surfaces defining an aperture in one of said members and a projection on the other of said members, said projection being positioned to project into said aperture when said support end is positioned in said tunnel member.

References Cited by the Examiner

UNITED STATES PATENTS

| 1,022,978 | 4/12 | Stevenson. | |
| 1,325,613 | 12/19 | Beebe | 210—469 |
| 1,624,745 | 4/27 | Kuhnast | 210—465 |
| 2,314,477 | 3/43 | Bodey | 210—497 X |
| 2,494,159 | 1/50 | Bernstein. | |
| 2,497,384 | 2/50 | Young. | |
| 2,501,940 | 3/50 | Hibbard. | |
| 2,813,631 | 11/57 | Odman | 210—499 X |

FOREIGN PATENTS

| 564,843 | 10/44 | Great Britain. |
| 599,217 | 3/48 | Great Britain. |

REUBEN FRIEDMAN, *Primary Examiner.*

HERBERT L. MARTIN, HARRY B. THORNTON,
*Examiners.*